G. WETTERHOLD.
HAY GRINDER.
APPLICATION FILED OCT. 15, 1909.
999,932.
Patented Aug. 8, 1911.
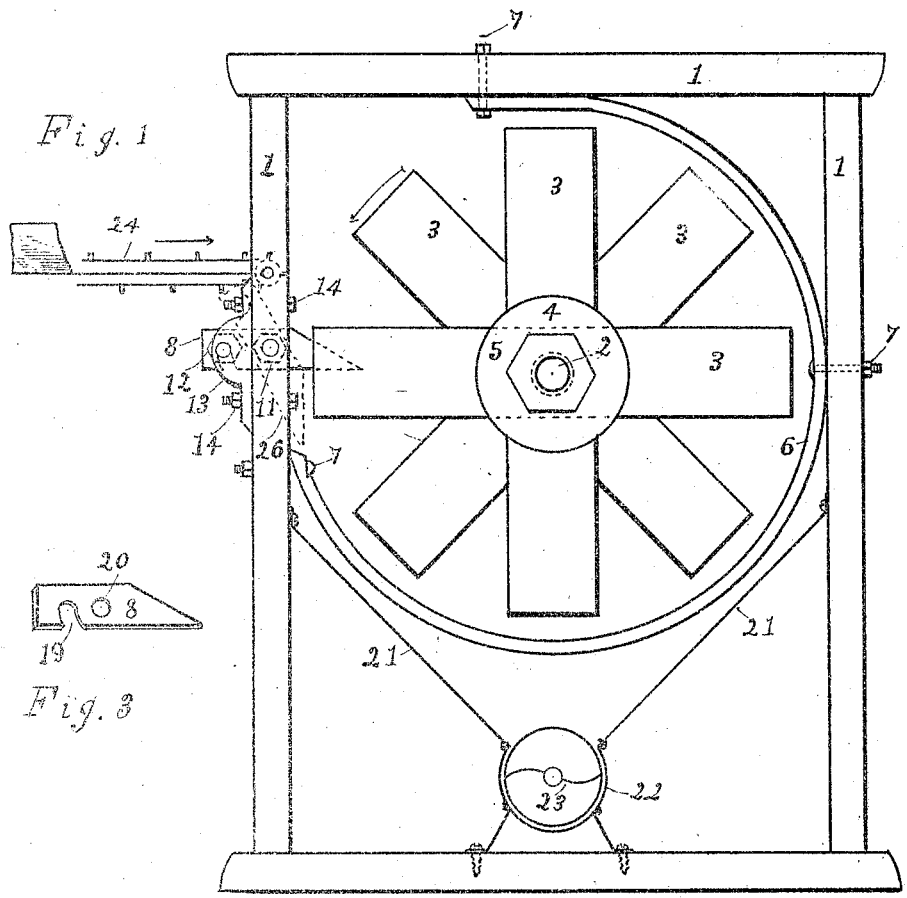
Fig. 1
Fig. 3
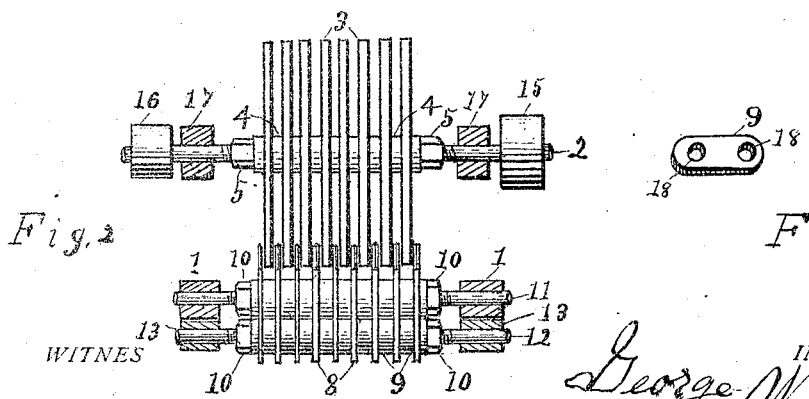
Fig. 2
Fig. 4
WITNESS
E. Glover.
E. C. Brown
INVENTOR.
George Wetterhold

UNITED STATES PATENT OFFICE.

GEORGE WETTERHOLD, OF WICHITA, KANSAS.

HAY-GRINDER.

999,932. Specification of Letters Patent. Patented Aug. 8, 1911.

Application filed October 15, 1909. Serial No. 522,717.

*To all whom it may concern:*

Be it known that I, GEORGE WETTERHOLD, a resident of Wichita, in the county of Sedgwick and State of Kansas, have invented certain new and useful Improvements in Hay-Grinders; and I do hereby declare the following to be a full, clear, and exact description of the invention, such as will enable others skilled in the art to which it appertains to make and use the same.

My invention relates to hay grinders.

The object of the invention is to produce a simple and inexpensive machine for cutting and grinding cured hay, and fodder.

Another object is to construct a machine that is difficult to wreck should any foreign object enter the machine.

For a full description of the operation thereof and also to acquire a knowledge of the details of construction and the means for effecting the result, reference is to be had to the following description and the accompanying drawings in which:

Figure 1, is a side elevation of my improved apparatus. Fig. 2, a plan view thereof. Fig. 3, a perspective view of one of the cutters. Fig. 4, a perspective view of one of the spacing links.

Similar numbers refer to similar parts throughout the specification.

Referring to the drawings 1, designates a frame which carries the hereinbefore described mechanism. I have provided a round shaft 2, having jam-nuts 5, on each end, one being a right hand screw, the other a left. Rectangular bars of steel about $\frac{1}{4}$ inch thick are provided with a hole in the center thereof. A plurality of these bars are mounted alternately with washers 4, on shaft 2, in the manner shown. The jam-nuts are screwed up tight which clamps the bars together on said shaft. This shaft is journaled in suitable bearings 17, (not shown in Fig. 1) and partially surrounding said bars is a circular casing 6, secured to frame 1, by bolts 7. The lower half of the said casing 6, is provided with perforations (not shown) to allow the ground material to pass through and be conducted down to a conveyer 22, by means of the inclines 21, and disposed of by an auger 23, on a vertical plane with shaft 2. In the frame 1, is mounted a shaft 11, parallel with shaft 2; and parallel to shaft 11, is another shaft 12, which shaft is mounted in castings 13, which are secured to the frame 2, with bolts 14. The cutters 8, are made of steel about 3 inches wide, 6 inches long and $\frac{3}{16}$ of an inch thick. One end is somewhat beveled and is ground to a sharp edge, each cutter has a hole 20, therein near its center and a recess or slot 19, near one end on its under side. These cutters are mounted on shafts 11, and 12, with the links 9, therebetween, as shown in Fig. 2, and in such a manner that the cutting edges pass between the bars 3, (see Fig. 2). It is to be noted that shaft 12, is positioned in the slot 19. The jam-nuts 10, are screwed up tight and clamp the cutters 8, and the links 9, on said shafts. The conveyer 24, conducts the hay to be ground into the machine. The pulleys 15, and 16, are mounted on shaft 2; 15, being the drive pulley for the bars, and 16, being the drive pulley for the conveyer 24.

Having described the construction and assembling of my machine, I will now describe its operation generally.

When the hay is conducted into the machine the bars 3, being only $\frac{3}{8}$ of an inch apart, and the cutters overlapping said bars, and passing therebetween, the hay will be thoroughly cut and pulverized. The bars 3, and the cutters 8, being held in position by friction, it is apparent should a wrench or some other foreign object enter the machine the cutters contacting with said object would be forced into the position indicated by the dotted lines 26, and thus prevent a wreck, also the bars 3, would if forced too hard yield and progressively tighten, the friction turning the jam-nuts toward each other, being held in a normal position by friction, they could readily be set right again. It is to be further noted that the bars are reversible which is of great benefit, as when one side gets worn and rounded off they could be reversed as hereinbefore stated.

It is obvious that the invention herein set forth is susceptible to changes and modifications involving mechanical skill which may be made within the scope of the claims without departing from the spirit thereof. I do not therefore desire to be understood as limiting myself to the precise construction of the parts shown in the drawings.

I claim—

1. In a hay grinder, the combination of a frame having mounted therein a shaft, said shaft having mounted alternately thereon rectangular bars and spacing washers, right and left hand jam nuts on the said shaft to clamp said washers and bars upon said shaft, parallel shafts mounted on said frame adjacent the shaft aforesaid, and cutters pivotally mounted upon one of said parallel shafts, each of said cutters having a slot on its under side the wall of which is adapted to contact with the other parallel shaft.

2. In a device of the character described, a rotary shaft with cutters thereon in combination with two parallel shafts having mounted thereon cutters, said cutters being pivotally mounted upon one of said shafts and said cutters having slots on their under sides, the walls of which are adapted to contact with the other parallel shaft and means for clamping said cutters upon said shafts whereby they may yield under sudden impact before breaking.

3. In a device of the character described, a rotary shaft with cutters thereon in combination with two parallel shafts having mounted thereon cutters, said cutters being pivotally mounted upon one of said shafts and said cutters having slots on their under sides, the walls of which are adapted to contact with the other parallel shaft and means for clamping said cutters upon said shafts whereby they may yield under sudden impact before breaking and means for setting the cutting edges at different angles.

In testimony whereof, I have signed this specification in the presence of two subscribing witnesses.

GEORGE WETTERHOLD.

Witnesses:
  E. C. Brown,
  E. Glover.